United States Patent Office 2,866,774
Patented Dec. 30, 1958

2,866,774

POLYETHER POLYURETHANE RUBBER

Charles C. Price, South Bend, Ind., assignor to University of Notre Dame, Notre Dame, Ind., a non-profit institution No Drawing. Application September 23, 1953
Serial No. 381,999

12 Claims. (Cl. 260—77.5)

This invention relates to rubbery reaction products of organic di-isocyanates and high molecular weight polyglycols which have unusual physical characteristics.

Rubbery reaction products of polyesters, such as the polyesters formed by reacting adipic acid and ethylene glycol to high molecular weight, are well-known and have excellent physical properties when properly prepared. All of the polyesters, however, are hydrolyzable in water and the greater the proportion of ester groups the greater is the susceptibility toward hydrolyzation. Since the rubbery polyester-polyisocyanate reaction products do not have the resistance to water that is desired, they cannot be employed in many applications for which they are otherwise fairly suited.

The polyethers have considerably greater stability against hydrolysis than have the polyesters and for this reason attempts were made to form rubbery products from them. Attempts to utilize polyethers such as the polyglycols for reaction with di-isocyanates, for example, polyethylene glycol including di- and tri-ethylene glycol, polypropylene glycol including di- and tri-propylene glycol and similar low molecular weight polyglycols, yielded nylon-like products which could be cold drawn into fibers and the like but which had few if any rubbery properties.

An object of this invention is to provide vulcanizable elastomeric polymerization products of polyglycols and organic di-isocyanates having superior physical properties, particularly high abrasion resistance, good flexibility at low temperatures, and good modulus, tensile strength, and elongation characteristics.

Other objects and advantages will be apparent from the following description of my invention.

I have found that vulcanizable, rubbery polymerization products can be formed by reacting high molecular weight polyglycols containing some alkylene oxide units having at least three carbon atoms with organic di-isocyanates or di-carboxylic acids.

While it has heretofore been considered desirable that rubbery materials be produced from polymer molecules which are essentially linear, I have found when the molecular weight is sufficiently high, linear molecular structure is unnecessary. Although it is preferred to have an entirely linear glycol for reaction with the di-isocyanate or di-carboxylic acid, it has until recently been difficult to obtain sufficiently high molecular weight linear polyglycols and I have found the deficiency in a molecular length of linear polyglycols may be balanced by increasing the molecular weight of the polyglycol by a branching operation in which a very small amount of a tri- or tetrahydric alcohol is incorporated in the glycol forming materials. When a small amount, 5 percent or less and preferably around .01 to 1 mol. percent, of an alcohol having more than 2 primary hydroxyl groups such, for example, as pentaerythritol is incorporated with propylene oxide or with a polypropylene oxide of comparatively high molecular weight, one obtains essentially a glycol having a molecular weight several times as high as the linear glycol obtained with the propylene oxide but with some branching in the chain thereof. Such a glycol surprisingly yields, when treated with di-carboxylic acids and di-isocyanates of a suitable type, rubbery reaction products having exceptionally desirable characteristics.

For corresponding structure the polyurethan is more resinous than the polyester. Therefore when a di-isocyanate is used as a corresponding agent for the polyglycol the molecular weight in the polyglycol must be somewhat higher or the amount of branching in the polyglycol must be less than when a polycarboxylic acid or its ester is used as a condensing agent.

As before mentioned, both the molecular weight of the glycols and the amount of branching makes considerable difference in the character of the products obtained. In the case of the linear polyglycols molecular weights as low as 600 are found to yield good rubbery products when suitably treated with a given di-isocyanate. When the glycol has substantial percentage of pentaerythritol, trimethylol propane or aliphatic alcohol having three to six primary hydroxyl groups added to the condensing materials, the molecular weight of the polyglycol required for formation of good plastic rubbery products become progressively higher as the amount of pentaerythritol or other such aliphatic polyhydric alcohol is increased although rubbery material was obtained with a molecular weight as low as 600. Only a very small amount of polyhydric alcohol having three to six primary hydroxyl groups need be present in the glycol in order to greatly increase the molecular weight of the product. If the essential linearity required for the formation of a rubbery reaction product is to be maintained, the percentage of polyhydric alcohol with three to six hydroxyls (preferably primary) in all cases should be less than 10 mol. percent of trimethylol propane or equivalent considering the number of hydroxyls in the molecule. It preferably should not exceed 1 or 2 mol. percent of the units obtained from the dihydric alcohol or alkylene oxide.

As one increases the amount of polyhydric alcohol having three or four or more primary hydroxyl groups therein, the reaction products become first less plastic, although still rubbery, and then as the proportion of the polyhydric alcohol is further increased the reaction products become resinous. Furthermore, the amount of hardening is in direct ratio to the amount of primary hydroxyls in the aliphatic alcohol. The amounts of an alcohol with four hydroxyls needed to obtain a given hardness is smaller than the amount of tri-hydroxyl alcohol needed to obtain the same hardness. A mole of pentaerythritol is equivalent to approximately 1⅓ mols of trimethylol propane in this respect. If the reaction product is to be used in making sponge which is cured as it is formed to entrap the carbon dioxide released in the reaction, the amount of an alcohol such as pentaerythritol present in the polymer may be increased up to as high as 10 mol. percent of the alkylene oxide units to provide a cured or cross-linked structure. A small amount of water and excess isocyanate is added for the purpose of effecting the desired reaction in the formation of sponge. Otherwise, percentages of pentaerythritol below 5 percent are preferred.

In accordance with the present invention, I have also found that polymeric materials built with alkylene oxide units having at least three carbon atoms, such as propylene oxide units, are far superior to those built with ethylene oxide units because the resultant rubbery product has improved water resistance and less tendency to crystallize. Propylene oxide units or other alkylene units having at least three carbon atoms incorporated in a polymer of sufficiently high molecular weight are required to give the product of the present invention. It is not essential, however, that the entire alkylene oxide chains of the glycol be made up of alkylene oxide units having at least three carbon atoms for it is found that the presence of relatively small proportions of propylene or high carbon atoms oxide units break up the regularity of the structure sufficiently to give rubbery products. The water resistance is, however, decreased as the amount of the propylene or higher alkylene oxide is decreased. As little as 15 or 20 percent of propylene oxide and/or higher alkylene oxide such as butylene oxide units or the like gives rubbery products of increased water resistance and less crystallinity when suitably reacted with di-isocyanates.

The polyglycols contemplated by this invention include polypropylene glycols, polybutylene glycols, other polyalkylene glycols formed from alkylene glycols having three or more carbon atoms and mixed polyglycols having at least 20 percent (preferably more) of propylene oxide units of 3 or more carbon atoms which polyglycols are characterized by being linear and by having a molecular weight of at least 600, as well as the condensation products of pentaerythritol and polyglycols preferably having less than 5 percent pentaerythritol and a molecular weight of at least 1000 and preferably at least 1500. Polypropylene and mixed propylene and ethylene glycols of 1000 molecular weight have recently become available commercially and the higher polyalkylene glycols of sufficiently high molecular weight may be made by condensing the alkylene oxide with pentaerythritol as already described.

While the high molecular weight polyalkylene glycols formed from copolymerization of ethylene oxide and propylene oxide and the like to give a mixed high molecular weight polyethylene-polypropylene glycol or high molecular weight polypropylene glycols are preferred for reaction, the high molecular weight polyethylene glycols and polypropylene glycols can be mixed together and the resultant polyglycol mixture employed. In any case, the polymer for reaction with the di-isocyanate should preferably have a molecular weight of over 1000 especially when the amount of branching is substantial.

The organic di-isocyanates suitable for use with this invention include m- and p-phenylene di-isocyanate; toluene di-isocyanate; p,p'-diphenyl di-isocyanate and substitution products thereof such as p,p'-diphenyl-3,3'-dimethyl (or -dimethoxy) di-isocyanate; 1,5-naphthylene di-isocyanate; 4,4-diphenylmethane di-isocyanate; and tetra-, penta-, hexa-, hepta- and octamethylene-$\omega,\omega'$-di-isocyanate. Both aromatic and aliphatic di-isocyanates can be used. The aliphatic di-isocyanates, however, are more toxic and for this reason are not preferred. Mixtures of diisocyanates and tri-isocyanates may also be used but the amount of tri-isocyanate, such as p,p',p''-triphenylmethane tri-isocyanate used should be limited to prevent excessive cross-linking and formation of hard, resinous polymers. The more trifunctional isocyanate present the less is the plasticity in the final product. In this respect the trifunctional isocyanates are similar in effect to the proportion of pentaerythritol in the polymer. Organic isothiocyanates, such as p,p'-phenylene di-isothiocyanate may also be used.

In place of an organic di-isocyanate, I can use any ester forming dicarboxylic acid, or its anhydride or ester such as sebacic acid, phthalic or glutaric anhydride, adipic acid, diethyl malonate, diethyl phthalate, terephthalic acid, oxodibutyric acid or the like.

Since the reaction between a polyglycol and di-carboxylic acid is not as fast as the reaction between a polyglycol and organic di-isocyanate, the polyglycols and the di-carboxylic acid should be reacted at elevated temperature to eliminate any water evolved in the reaction and therefore drive the reaction nearer completion.

At least part of the reaction between the polyglycol and the di-isocyanate occurs rapidly at room temperature. When both isocyanate groups are of equal reactivity set up in the polymer is likely to occur before it can be handled. This difficulty is reduced by using isocyanates such as toluene diisocyanate with groups of different reactivity. Di-isocyanate dimers may also be used in place of the di-isocyanate to slow down the reaction rate.

The following examples further illustrate my invention.

EXAMPLE 1

100 parts of Ucon fluid 75-H-1400 (a polyglycol copolymer of 75 parts of ethylene oxide and 25 parts of propylene oxide having two terminal hydroxyl groups, a molecular weight of 2000, and being sold by the Carbide and Carbon Chemicals Division of Union Carbide and Carbon Corporation of New York, New York) was heated with 20 parts of TDI (2,4-toluene di-isocyanate) at 150° C. for ten minutes. It was then allowed to cool to about 60° C. at which time the viscosity of the mixture was about the same as honey.

The mixture was placed in a Day mixer (a powerful double bladed kneader) and 6 parts of water were added. Upon the addition of water, carbon dioxide was evolved and the viscosity of the mix increased until finally a rubbery material was formed. This was removed from the mixer and placed on a rubber mill. 42 parts of carbon black, 2 parts of paraformaldehyde and 1 part of salicylic acid were milled in and the rubber stock was placed in a mold and cured for 30 minutes at 310° F. The resulting sheet was well cured and had excellent properties. Tensile strengths in excess of 2800 p. s. i. were obtained.

EXAMPLE 2

Pentaerythritol was reacted with sodium to form the corresponding sodium alcoholate. Propylene oxide and the pentaerythritol were combined in a mol. ratio of 100 mols of propylene oxide to 1 mol. of pentaerythritol alcoholate. On heating at about 75° C. a dark brown, sticky, gummy polymer formed in approximately 20 minutes. 100 grams of polymer were then reacted with 15 grams of diethyl phthalate at around 140° C. to give an elastomeric polymer.

EXAMPLE 3

1 mol. of propylene oxide (70 cc.), .05 mol. of pentaerythritol (6.8 grams) and about 1.5 gram of sodium were placed in a pressure reactor at 142 to 150° C. This formed a viscous brown polymer. 100 grams of polymer were dissolved in alpha-chloro naphthalene and 15 grams of TDI were added to the polymer. At the end of about 15 minutes a dark brown elastomer was formed.

EXAMPLE 4

1 mol. of Ucon 74-H-1400 was condensed with ½ mol. of MDI (p,p' diphenyl methane di-isocyanate) for approximately 5 minutes and was condensed with .65 mol of TDI in the presence of ½ mol. of tri-ethylamine. This formed a viscous honey-like material. This was finally reacted with .56 mol of water to form rubbery polymer.

The polymer was compounded as follows:

| | Grams |
|---|---|
| Polymer | 250 |
| Carbon black | 125 |
| Paraffin | 5 |
| Salicylic acid | 2 |
| Paraformaldehyde | 1 |

This compound was cured for 45 minutes at 260° F. The following properties were obtained, as compared with Paracril 18-80 (a butadiene-acrylonitrile rubber manufactured by the U. S. Rubber Company).

Table I

| | RM-7B | Paracril 18-80 |
|---|---|---|
| Tensile Strength | 3,470 | 3,250 |
| 300% Modulus | 2,680 | 2,550 |
| Elongation (Percent) | 380 | 410 |
| Hardness | 70 | 68 |

Table I—Continued

VOLUME INCREASE AT ROOM TEMPERATURE FOR 48 HOURS (PERCENT)

|  | RM-7B | Paracril 18-80 |
|---|---|---|
| Hexane | 10 | 19.5 |
| Benzene | 40.8 | 172 |
| Acetone | 0 | 16.5 |
| Water | 172 | 9.5 |

LOW TEMPERATURE FLEXIBILITY—GEHMAN TR TEST

| Retraction at— | °C. | °C. |
|---|---|---|
| 10% | −52 | −38.5 |
| 20% | −50 | −34 |
| 30% | −43 | −32.5 |
| 40% | −38.5 | −31.0 |
| 50% | −29.5 | −29.5 |
| 60% | −18 | −26 |

| Heat Resistance | 8 hours @ 320° F. | 24 hours @ 250° F. | 8 hours @ 320° F. | 24 hours @ 250° F |
|---|---|---|---|---|
|  | Percent | Percent | Percent | Percent |
| Tensile Change | −64 | −31 | −52 | −15 |
| Elongation Change | −34 | −23 | −28 | −21 |
| Point Hardness Change | −9 | −2 | 8 | 4 |

EXAMPLE 5

100 grams of Pluronic L62 (a mixed polyethylene-polypropylene glycol polymer with terminal hydroxyl groups, having molecular weight of 2000, and being manufactured by the Wyandotte Chemical Corporation of Wyandotte, Michigan) were mixed with 18 parts of TDI at 180° C. for a few minutes and the resulting product was reacted with water to give a superior elastomeric polymer similar to those of the preceding examples.

The polyglycols are believed to be made up of high molecular weight polymers made up of propylene, ethylene, or other alkylene units attached to one another through an ether linkage and are provided with terminal hydroxyl groups. The polymers built up from propylene oxide units or other alkylene oxide units are somewhat similar to the polyglycols except that they are built from chain starters such as pentaerythritol or trimethylol propane. These polymers are also believed to contain terminal hydroxyl groups.

The polyglycols and di-isocyanates are combined on approximately an equimolar basis. Generally from 5 to 25 and preferably from 10 to 20 parts of di-isocyanate are used for each 100 parts of polyglycol. When the elastomer is too soft and gummy, additional di-isocyanate is added and when it is too hard and resinous, less isocyanate should be added. The polyglycol should preferably be heated prior to the reaction at least until it is in liquid form.

It is to be understood that in accordance with the provisions of the patent statutes, variations and modifications of the invention described herein may be made without departing from the scope of the invention.

Having thus described my invention, what I claim is:

1. A process of forming a polyurethane reaction product comprising the steps of mixing in a liquid form (1) a hydroxy terminated polyether glycol polymer having a molecular weight of at least 600 which is a condensation product of an alkylene oxide having from 2 to 4 carbon atoms and about .01 to 10 mol. percent based on the alkylene oxide of a polyhydric alcohol having less than 7 carbon atoms and having 3 to 6 primary hydroxyl groups, at least 20 percent of said alkylene oxide having more than 2 carbon atoms, and (2) at least about an equal molar amount of an organic diisocyanate based on said polyether glycol, and reacting the mixture until a second polymer having a chain length substantially greater than that of said polyether glycol polymer is formed.

2. The process of claim 1 in which the reactants are heated from 100 up to 200° C. and wherein the said polyhydric alcohol is about 1 to 5 mol percent of the said alkylene oxide.

3. A process of forming a polyurethane reaction product comprising the steps of mixing (1) a condensation product of propylene oxide and about .01 to 10 mol percent based on the propylene oxide of an aliphatic polyhydric alcohol of less than 7 carbon atoms and having from 3 to 6 hydroxyl groups, said condensation product having a molecular weight of at least 600 and (2) at least about one mole per mol of condensation product of an organic diisocyanate, and reacting the mixture until a second polymer having a chain length substantially greater than that of said condensation product is formed.

4. A process of preparing a polyurethane reaction product comprising the steps of mixing (1) a liquid hydroxyl terminated polyether glycol polymer having a molecular weight of at least 600 which is a condensation product of an alkylene oxide of 2 to 4 carbon atoms inclusive, at least 20 percent of said alkylene oxide having more than 2 carbon atoms and about .01 to 10 mol percent based on the alkylene oxide of an aliphatic polyhydric alcohol of less than 7 carbon atoms and having 3 to 6 hydroxyl groups and (2) at least an equal molar amount based on said condensation product of an organic polyisocyanate having 2 to 3 functional isocyanate groups, and reacting the mixture to form a reaction product having a chain length substantially greater than that of said polyether glycol polymer.

5. A process of preparing a polyurethane reaction product comprising the steps of mixing (1) a liquid hydroxyl terminated condensation product of an alkylene oxide having 2 to 4 carbon atoms of which at least 15 percent is propylene oxide and about .01 to 5 mol percent based on the alkylene oxide of an aliphatic polyhydric alcohol of less than 7 carbon atoms and having 3 to 6 hydroxyl groups, said condensation product having a molecular weight of at least 600, and (2) an excess of an organic polyisocyanate having 2 to 3 functional isocyanate groups over that required for reaction with the hydroxyl terminal groups of the condensation product, and reacting the mixture until a second polymer having a chain length substantially greater than that of said condensation product is formed.

6. A product made according to process of claim 1.
7. A product made according to process of claim 2.
8. A product made according to process of claim 4.
9. A product made according to process of claim 5.

10. A process of forming a polyurethane reaction product comprising the steps of mixing (1) a first polymer comprising a condensation product of about 100 parts by weight of propylene oxide and about .01 to 10 mol percent based on the propylene oxide of pentaerythritol, said first polymer having a molecular weight of at least 600, and (2) at least about an equal molar amount based on the amount of said condensation product used of an organic diisocyanate, and reacting the mixture until a second polymer having a chain length substantially greater than that of said first polymer is formed.

11. A process of forming a polyurethane comprising the steps of mixing (1) a condensation product of propylene oxide and about .01 to 10 mol perecent based on the propylene oxide of trimethylol propane, said condensation product having a molecular weight of at least propylene oxide and about .01 to 10 mol percent based on the amount of said condensation product used of an organic diisocyanate, and reacting the mixture until a second polymer having a chain length substantially greater than that of said condensation product is formed.

12. A polyurethane reaction product of (1) about one mole of an organic diisocyanate and (2) about one mole of a condensation product of an alkylene oxide of 2 to 4 carbon atoms of which at least 15 percent is propylene oxide, and about .01 to 10 mol percent based on the alkylene oxide of an aliphatic polyhydric alcohol of less than 7 carbon atoms and having 3 to 4 hydroxyl groups, said condensation product being hydroxy terminated and having a molecular weight of at least 600, said polyurethane reaction product having a chain length substantially greater than that of said condensation product.

References Cited in the file of this patent

UNITED STATES PATENTS

| | | |
|---|---|---|
| 2,388,206 | Boulton et al. | Oct. 30, 1945 |
| 2,531,392 | Breslow | Nov. 28, 1950 |
| 2,567,076 | Livengood | Sept. 4, 1951 |
| 2,626,935 | De Groote | Jan. 27, 1953 |
| 2,687,430 | Snow | Aug. 24, 1954 |
| 2,692,874 | Langerak | Oct. 26, 1954 |
| 2,702,797 | Rugg | Feb. 22, 1955 |
| 2,726,219 | Hill | Dec. 6, 1955 |

FOREIGN PATENTS

| | | |
|---|---|---|
| 892,107 | France | Mar. 29, 1944 |

OTHER REFERENCES (London) (Pinner, Plastics), May 1947, page 257.

UNITED STATES PATENT OFFICE
CERTIFICATE OF CORRECTION

Patent No. 2,866,774                                               December 30, 1958

Charles C. Price

It is hereby certified that error appears in the printed specification of the above numbered patent requiring correction and that the said Letters Patent should read as corrected below.

Column 6, line 62, strike out "propylene oxide and about .01 to 10 mol percent based" and insert instead -- 600, and (2) at least about an equal molar amount based --.

Signed and sealed this 23rd day of June 1959.

(SEAL)
Attest:

KARL H. AXLINE                                                      ROBERT C. WATSON

Attesting Officer                                            Commissioner of Patents